US010643499B2

(12) United States Patent
Free et al.

(10) Patent No.: US 10,643,499 B2
(45) Date of Patent: May 5, 2020

(54) TRAINING SYSTEM AND METHOD FOR A DYNAMIC FLUID FLOW SYSTEM

(71) Applicants: Michael J. Free, Burlington, KS (US); Eric D. Peterson, Burlington, KS (US)

(72) Inventors: Michael J. Free, Burlington, KS (US); Eric D. Peterson, Burlington, KS (US)

(*) Notice: Subject to any disclaimer, the term of this patent is extended or adjusted under 35 U.S.C. 154(b) by 411 days.

(21) Appl. No.: 15/412,382

(22) Filed: Jan. 23, 2017

(65) Prior Publication Data
US 2017/0213483 A1     Jul. 27, 2017

Related U.S. Application Data

(60) Provisional application No. 62/281,434, filed on Jan. 21, 2016.

(51) Int. Cl.
*G09B 25/02*     (2006.01)
*G09B 25/00*     (2006.01)

(52) U.S. Cl.
CPC .......... *G09B 25/025* (2013.01); *G09B 25/00* (2013.01)

(58) Field of Classification Search
CPC ...... G09B 25/025; G09B 25/02; G09B 25/00; G09B 23/12; G09B 23/08
See application file for complete search history.

(56) References Cited

U.S. PATENT DOCUMENTS

| | | | | |
|---|---|---|---|---|
| 2,958,142 A * | 11/1960 | Kershaw | ................ | G09B 25/02 434/72 |
| 3,363,340 A * | 1/1968 | McKinley | ............... | G09B 23/12 434/126 |
| 3,673,705 A * | 7/1972 | Wright | ................... | G09B 23/12 434/126 |
| 5,178,543 A * | 1/1993 | Seams | ...................... | G09B 9/00 434/126 |
| 5,354,203 A * | 10/1994 | Kotch | ...................... | G09B 9/00 434/126 |
| 2003/0124495 A1 * | 7/2003 | Pelkus | ................. | G09B 25/025 434/224 |
| 2014/0076520 A1 * | 3/2014 | Lu | ............................ | G06F 1/20 165/104.14 |
| 2015/0276554 A1 * | 10/2015 | Vertenoeuil | ............ | G01N 33/28 73/116.03 |

* cited by examiner

*Primary Examiner* — Eugene L Kim
*Assistant Examiner* — Alyssa M Hylinski
(74) *Attorney, Agent, or Firm* — Law Office of Mark Brown, LLC; Christopher M. DeBacker

(57) ABSTRACT

A dynamic fluid flow system for training. The system incorporates transparent piping, transparent pump components, transparent valve components, and other components found in most fluid flow systems which provide visual feedback for training purposes when training personnel on the fluid flow system. The fluid flow system of the present invention includes all elements which would typically be found on a fluid flow system used in industrial facilities such as power plants, and allows full training and certification of personnel on a full interactive dynamic system which produces visual feedback not capable on existing training systems or even on actual systems used in industrial applications. An embodiment of the present invention could be in the form of a portable system which can be transported in a standard trailer or even deployed in a vehicle for remote deployment.

5 Claims, 12 Drawing Sheets

TRAINING SYSTEM AND METHOD FOR A DYNAMIC FLUID FLOW SYSTEM

CROSS-REFERENCE TO RELATED APPLICATIONS

This application claims priority in U.S. Provisional Patent Application No. 62/281,434 filed Jan. 21, 2016, which is incorporated herein by reference.

BACKGROUND OF THE INVENTION

1. Field of the Invention

The present invention relates generally to a training system and method for use thereof, and more specifically to training system and method for use within a dynamic fluid flow system.

2. Description of the Related Art

Fluid flow systems incorporate a number of instruments, valves, pumps, heat exchangers, and other elements which require personnel to become intimately familiar with. The problem is that testing on actual fluid flow systems in practice cannot be used for training and practice without potentially damaging the system itself or its components, and computer simulations cannot provide the tactile and dynamic training and teaching components that can be achieved with a real fluid flow system. Existing training tools provide physical training for limited elements, and cannot produce the dynamic results of a full fluid flow system. What is needed is a dynamic fluid flow system for training purposes which provide visual and tactile teaching elements for training.

Heretofore there has not been available a training system or method for a dynamic fluid flow system with the advantages and features of the present invention.

BRIEF SUMMARY OF THE INVENTION

The present invention generally provides a dynamic fluid flow system for training. The system incorporates transparent piping, transparent pump components, transparent valve components, and other components found in most fluid flow systems which provide visual feedback for training purposes when training personnel on the fluid flow system. The fluid flow system of the present invention includes all elements which would typically be found on a fluid flow system used in industrial facilities such as power plants, and allows full training and certification of personnel on a full interactive dynamic system which produces visual feedback not capable on existing training systems or even on actual systems used in industrial applications. An embodiment of the present invention could be in the form of a portable system which can be transported in a standard trailer or even deployed in a vehicle for remote deployment.

The present invention provides an innovative, hands-on solution for staff and personnel training. The clear material that the elements are constructed from allows students and other staff to easily visually see the effects of system inputs in real time. Flow theory can be seen in action which can enhance the staff and personnel members' understanding of the fluid flow mechanics they have been taught, including cavitation, voiding, valve throttling, filling, venting & draining, and other fluid flow mechanics.

BRIEF DESCRIPTION OF THE DRAWINGS

The drawings constitute a part of this specification and include exemplary embodiments of the present invention illustrating various objects and features thereof.

DETAILED DESCRIPTION OF THE PREFERRED EMBODIMENTS

I. Introduction and Environment

Figure 1:
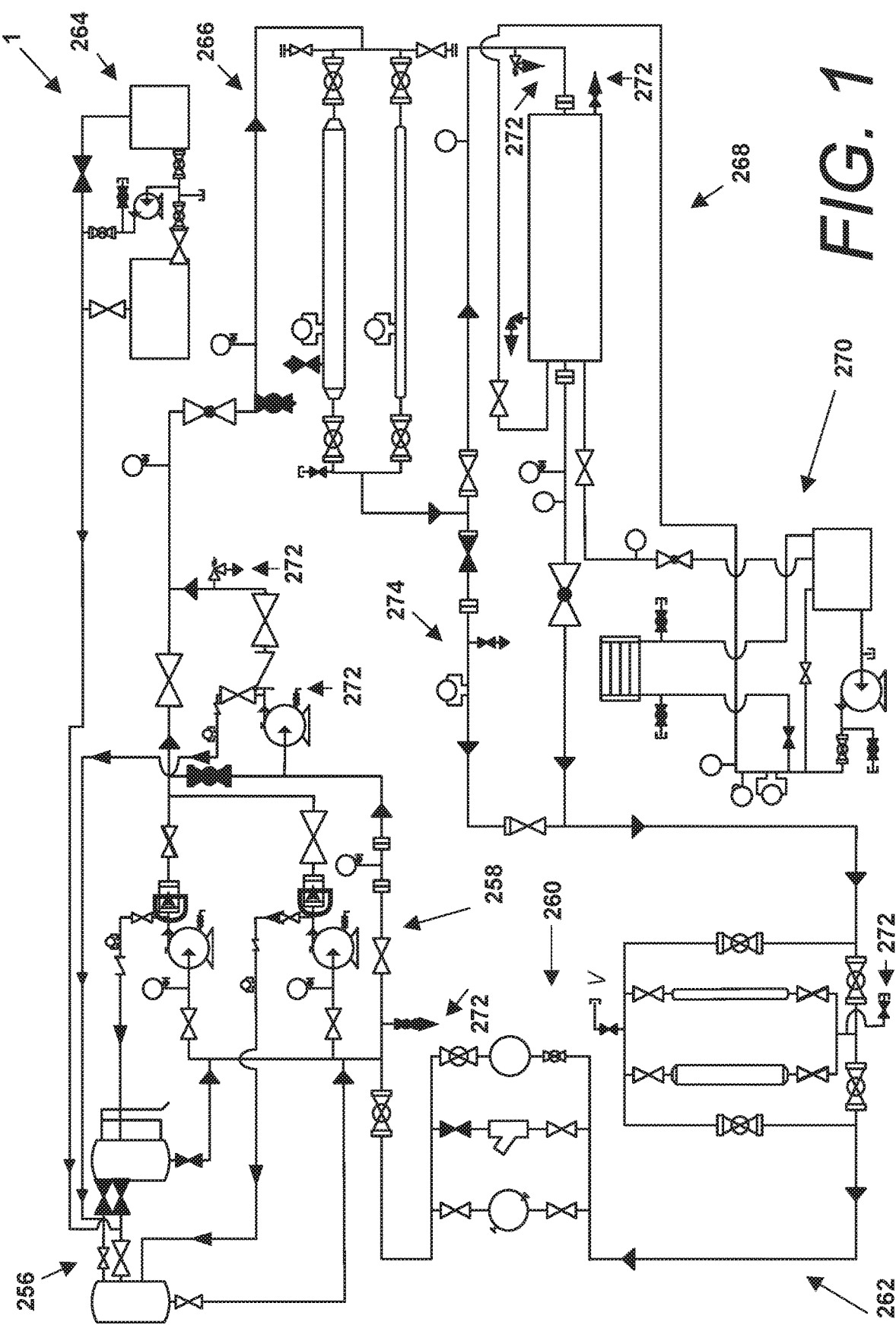
FIG. 1 is a piping diagram for a preferred embodiment of the present invention.

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

Fluid flow systems as discussed in the present invention include any systems capable of producing flowing fluid through a series of pipes, valves, pumps, and other instruments. These systems may be used in any industrial or commercial application, including but not limited to power plants, breweries, food preparation, and gas or liquid transfer and production. It is the intent of the present invention that all feasible elements be constructed from a transparent or semi-transparent material such that the flow of fluid through all components is visible to trainees and trainers utilizing the system.

II. Preferred Embodiment Dynamic Fluid Flow Training System 1

The primary purpose of the present invention is to create and use a dynamic fluid flow system for training purposes. The present invention is completely functional and could be used in an actual fluid flow system for industrial or commercial purposes. As shown in FIG. 13 the invention is constructed from a plurality of transparent PVC pipe segments connecting several valves, pumps, and other components of a fluid flow system. Each of the valves, pumps, and components are also constructed from transparent PVC material or other similar material (e.g. acrylic) which allows trainees an unprecedented view of the fluid flowing through the system.

The primary purpose of the present invention is to provide a tactile training system that the trainees can interact with while providing visual demonstrations of what is actually occurring inside of the system at all times. The invention can provide instruction, demonstration, testing, and practice of a number of situations including, but not limited to:
  Cavitation effects on pumps and motors
  Water Hammer
  Head loss calculations
  Centrifugal and Positive displacement pump operations and maintenance
  Single, Parallel and Series pump operating characteristics
  Proper fill, vent and drain of systems
  Implications and damage due to improper fill and vent of systems
  Heat generation and removal
  Heat exchanger types, characteristics and maintenance
  Flange training, gasket replacement and proper bolt torque practices
  Void characteristics and management
  Chemical injection flow properties
  Filter and strainer applications and maintenance
  Flow characteristics of different piping sizes
  System losses through different piping valves and components
  Dynamic and laminar flow characteristics
  Valve throttling characteristics
  Valve packing replacement
  Expansion joint maintenance
  Strainer and filter maintenance In addition to the theory and practical applications of the present invention, the system can also provide training and certification in a number of related areas, such as human performance tool training and utilization (e.g. STAR; Peer Checks; Concurrent Checks and Independent Verifications; Procedure Use and Adherence; Place Keeping; and Questioning Attitude) as well as Divisional error reduction fundamentals and techniques (e.g. Teamwork; Knowledge; Control; Monitoring; and Conservatism).

Other training and teaching results that can be provided while using the present invention include Maintenance Work Order Development and Implementation; Print Reading Fundamentals and Practical Application; and Clearance Order and Red Hold Tag Installation and Removal.

The system as shown in FIGS. 1-9 provides a CCFF permanently mounted fluid flow trainer. The multi-level platforms consist of a framework of strut channel design materials or suitable similar materials. The equipment is strategically placed on decking trays designed to contain and divert any fluids to drains in the event of unforeseen leakage, draining, maintenance activities, and in the case of failure. The placement of the equipment facilitates the demonstration and instruction methods for training on the system. Various instruments and components are used to monitor operating parameters throughout the system, such as pressure sensors, flow rate sensors, and other devices.

FIG. 1 shows an example piping diagram for a first embodiment of the present invention which is a room-sized fluid flow training system 1. The system is broken up into several sections as shown in FIGS. 2-11. These sections include the Surge Tank Section 256, the Pump Section 258, the Filter Section 260, the Vertical Flow Velocity Demonstrator Section 262, the Makeup/Drain Tank Section 264, the Horizontal Flow Velocity Demonstrator Section 266, the Heat Exchanger Section 268, and the Secondary Loop Section 270.

Figure 2:
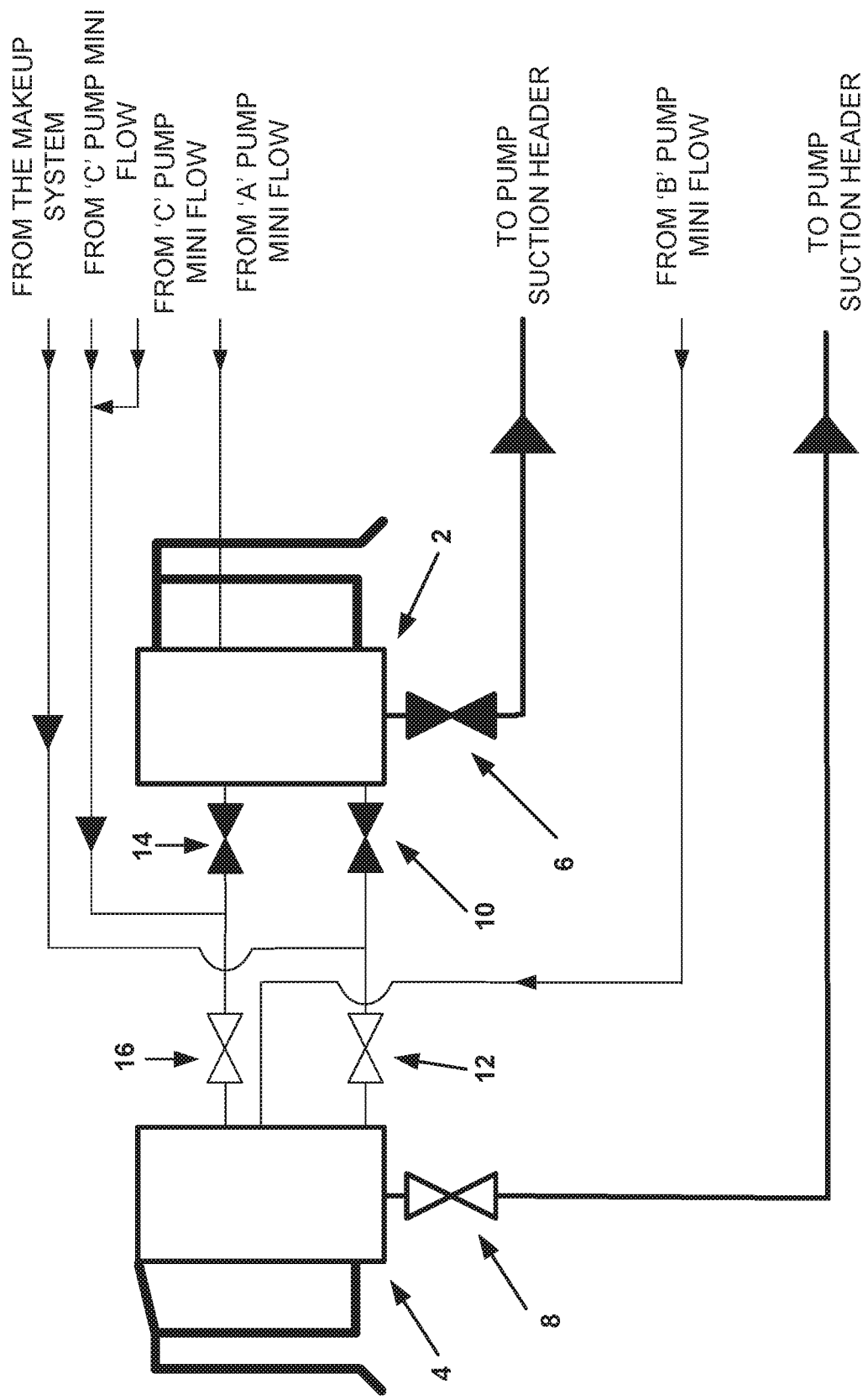
FIG. 2 is a piping diagram of a surge tank portion of the preferred embodiment shown in FIG. 1.

FIG. 2 shows the Surge Tank Section 256 in more detail. This includes the primary surge tank "A" 2 and the primary surge tank "B" 4. Tank "A" has a first surge tank outlet isolation valve 6, and tank "B" has a second surge tank outlet isolation valve 8. Similarly, tank "A" has a first surge tank makeup inlet isolation valve 10 and tank "B" has a second surge tank makeup inlet isolation valve 12. Finally, FIG. 2 shows a first "A" surge tank "C" minimum flow inlet isolation valve 14, and a second "B" surge tank "C" minimum flow inlet isolation valve 16. These surge tanks store the majority of the fluid for pumping through the system, and unbalancing these two tanks results in many of the teachable elements discussed above within the system.

The arrows on FIG. 2 show how the fluid flows through the system from the makeup system, "A" pump mini flow, "B" pump mini flow, and "C" pump mini flow, then out to the Pump Suction Header.

Figure 3:
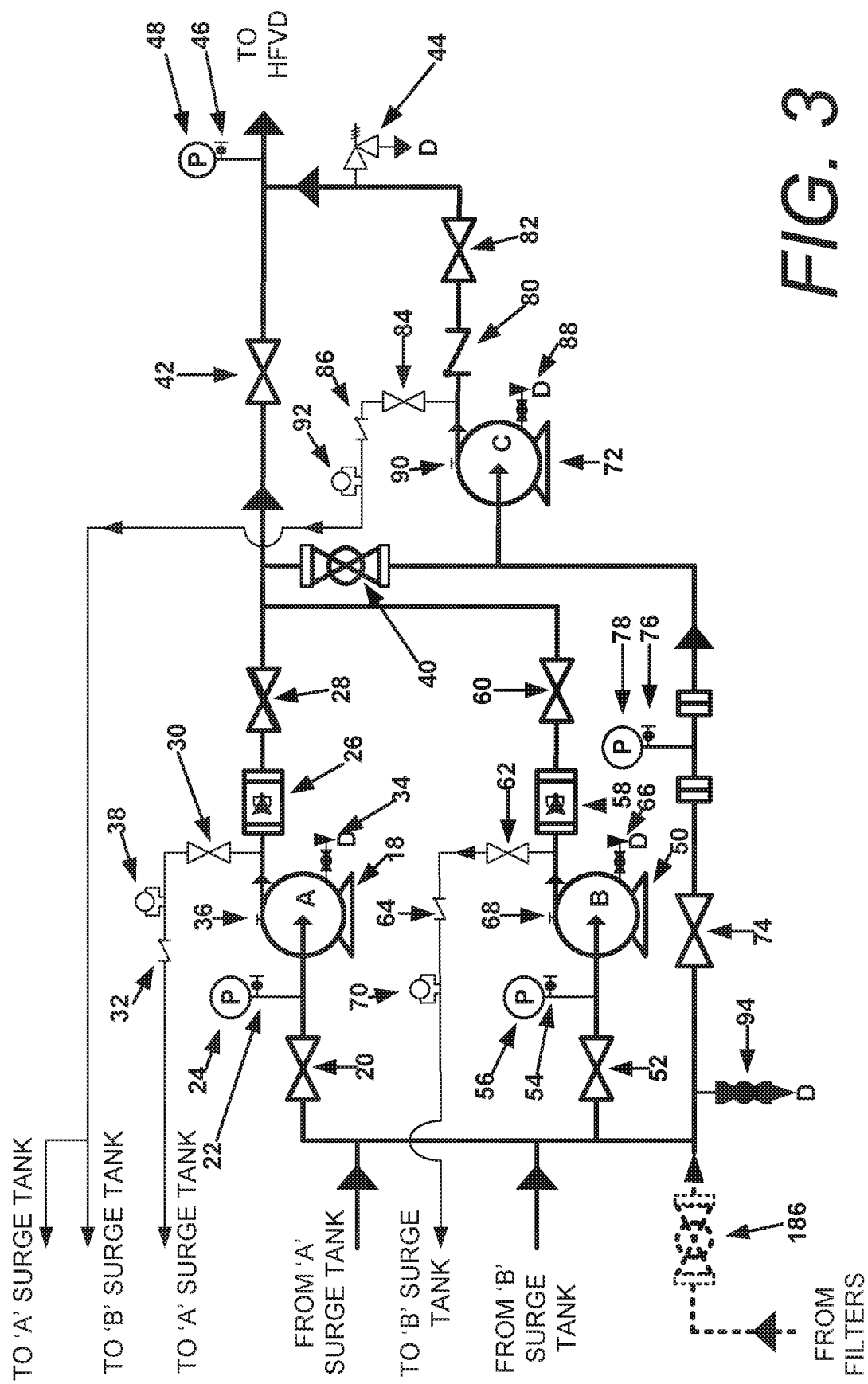
FIG. 3 is a piping diagram of a pump portion of the preferred embodiment shown in FIG. 1.

FIG. 3 shows the primary pump section 258 in more detail. Here, the "A" Primary Loop Pump 18, the "B" Primary Loop Pump 68, and the "C" Primary Loop Pump 72 form three flow loops. Each pump has a respective casing drain valve, such as the "A" casing drain valve 34, the "B" casing drain valve 66, and the "C" casing drain valve 88. Each also has a respective casing vent valve, such as the "A" casing vent valve 36, the "B" casing vent valve 68, and the "C" casing vent valve 90.

An "A" primary loop pump suction isolation valve 20 feeds into the "A" primary pump 18 past an "A" suction pressure indicator vent valve 22 with associated indicator 24. The "A" primary loop pump then flows out into an "A" discharge check valve 26, through an "A" discharge isolation valve 28. Alternative flow passes through an "A" minimum flow valve 30, "A" minimum flow indicator 38 and "A" minimum flow check valve 32 back to the "A" surge tank 2.

A "B" primary loop pump suction isolation valve 52 feeds into the "B" primary pump 50 past a "B" suction pressure indicator vent valve 54 with associated indicator 56. The "B" primary loop pump then flows out into a "B" discharge check valve 58, through a "B" discharge isolation valve 60. Alternative flow passes through a "B" minimum flow valve 62, "B" minimum flow check valve 64, and "B" minimum flow indicator 70 back to the "B" surge tank 4.

Flow reaches the "C" primary loop pump 72 through a "C" series inlet valve 40 fed from the "A" and "B" pumps, and/or from the "A" 2 and "B" 4 surge tanks through "C" primary loop pump suction isolation valve 74. The surge tank flow joins flow from the filters through a strainer section to pump suction return isolation valve 186, passing through a "C" suction isolation valve 74 and past a "C" suction pressure indicator vent valve 76 and associated indicator 78 into the "C" primary loop pump 72. Note that alternative flow from the surge tanks and/or filters may pass through a pump section drain valve 94 to drain.

The "C" primary loop pump 72 flows out in two directions. Flow back to the "A" and "B" surge tanks passes through a "C" minimum flow valve 84, "C" minimum flow check valve 86, and "C" minimum flow indicator 92. Flow to the Horizontal Flow Velocity Demonstrator Section (HFVD) instead passes through a "C" discharge check valve 80, a "C" discharge isolation valve 82, and past a discharge pressure indicator 48 having a vent valve 46. Alternative flow to drain may flow past a primary loop pressure control valve 44.

Figure 4:
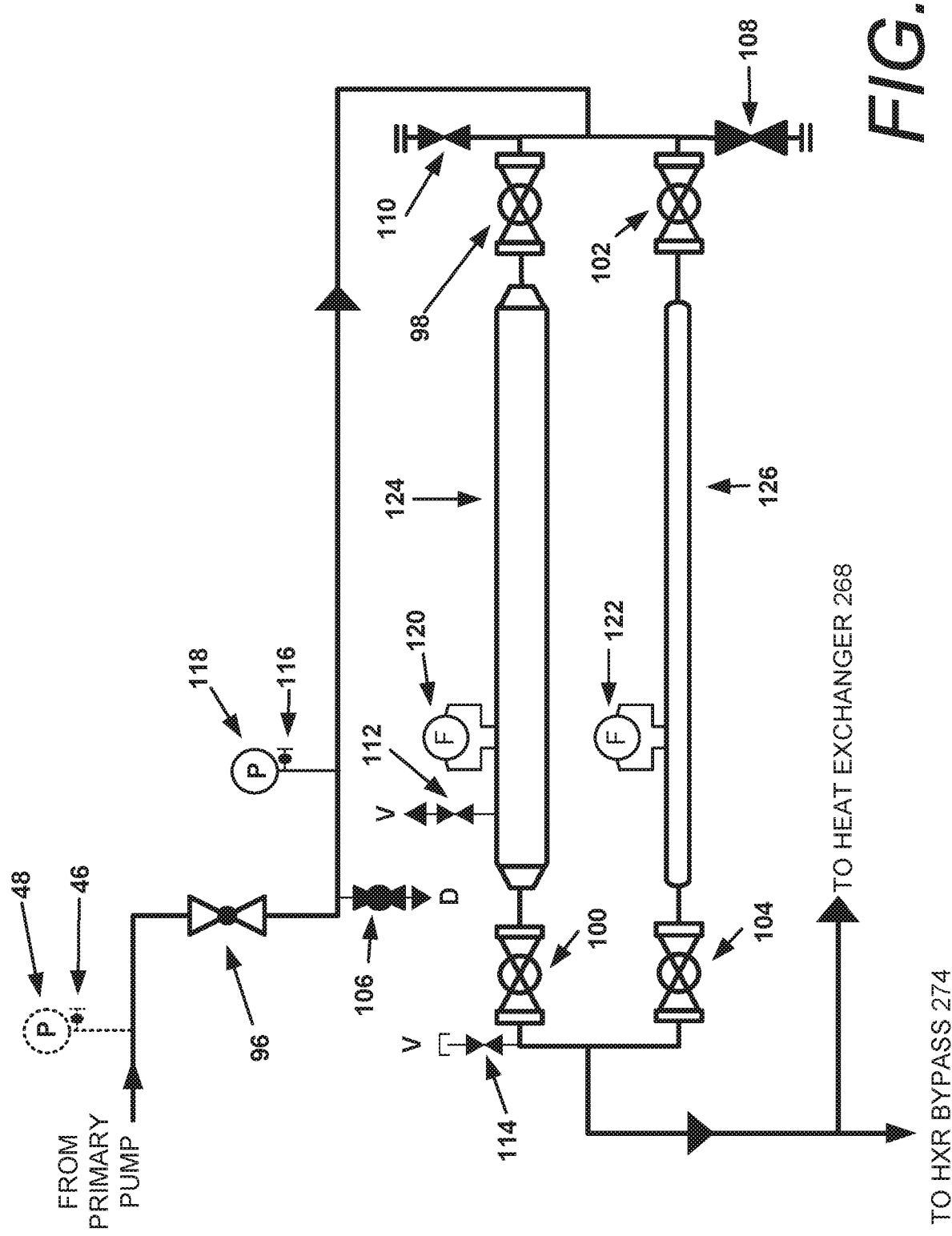
FIG. 4 is a piping diagram of a horizontal flow velocity demonstrator portion of the preferred embodiment shown in FIG. 1.

FIG. 4 shows the HFVD section 266 in more detail. Flow into the HFVD, as discussed above, comes from the primary pumps "A" 18, "B" 50, and "C" 72 past the discharge pressure indicator 48 and through a pressure control throttle valve 96. A primary loop drain valve 106 along the flow path allows for optional draining. The flow then continues past a primary side throttle valve downstream pressure indicator 118 with associated vent valve 116. From there, flow splits and passes through either a 4" horizontal flow velocity demonstrator inlet isolation valve 98 or a 2" horizontal flow velocity demonstrator inlet isolation valve 102. Each end of this split section is also capped with an inlet drain valve 108 or an inlet vent valve 110.

The 4" inlet isolation valve 98 leads the flow through to a 4" horizontal flow velocity demonstrator pipe 124 which, being made of transparent material, provides ideal demonstration of effects within the flow of the fluid being pumped through the system 1, such as cavitation of the fluid. A 4" flow indicator 120 and 4" vent valve 112 is connected to the 4" demonstrator pipe 124. Flow exits the 4" demonstrator pipe through to a 4" outlet isolation valve 100, where it joins the flow exiting a 2" horizontal flow velocity demonstrator pipe 126. This pipe also includes a 2" flow indicator 122 and flow exits the 2" velocity demonstrator pipe 126 into a 2" outlet isolation valve 104 to join the flow from the 4" velocity demonstrator pipe 124. An outlet vent valve 114 is present here as well. Flow then exits the HFVD section 266 towards the Heat Exchanger (HXR) 268 or to the HXR Bypass section 274.

Figure 5:
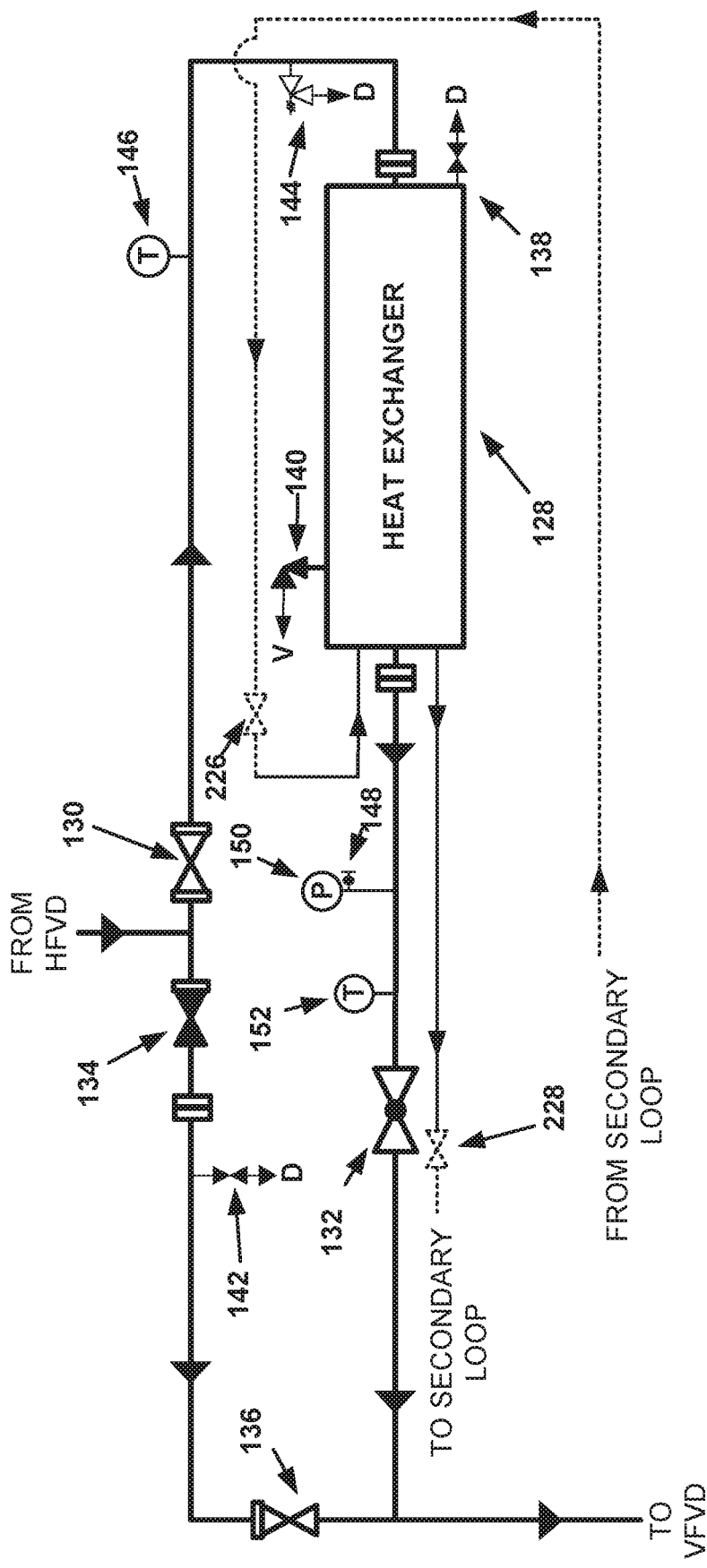
FIG. 5 is a piping diagram of a heat exchanger portion of the preferred embodiment shown in FIG. 1.

FIG. 5 shows the HXR section 268 in more detail. The primary component here is the heat exchanger 128 itself. The fluid flow comes in from the HFVD as previously discussed in FIG. 4, as well as from the secondary loop after passing through a heat exchanger secondary loop inlet isolation valve 226. Flow from the HFVD enters the HXR section and splits into two directions, the first passing through a HXR inlet isolation valve 130 and past a HXR primary side inlet temperature indicator 146 and HXR pressure control valve 144 and into the heat exchanger 128; alternative flow passes through a heat exchanger bypass inlet isolation valve 134, past a HXR bypass drain valve 142 and through a HXR bypass outlet isolation valve 136, where it joins flow out of the heat exchanger and passes through to the vertical flow velocity demonstrator (VFVD) section, bypassing the heat exchanger entirely.

The heat exchanger 128 includes a drain valve 138 and vent valve 140. Flow out of the heat exchanger 128 passes a primary side pressure indicator 150 with an associated pressure indicator vent valve 148. Flow further passes a primary side outlet temperature indicator 152 and through an outlet throttle valve 132 before joining up with the bypass flow and heading to the VFVD. Alternative flow from the heat exchanger 128 passes through a heat exchanger secondary loop outlet isolation valve 228 on its way to the secondary loop.

Figure 6:
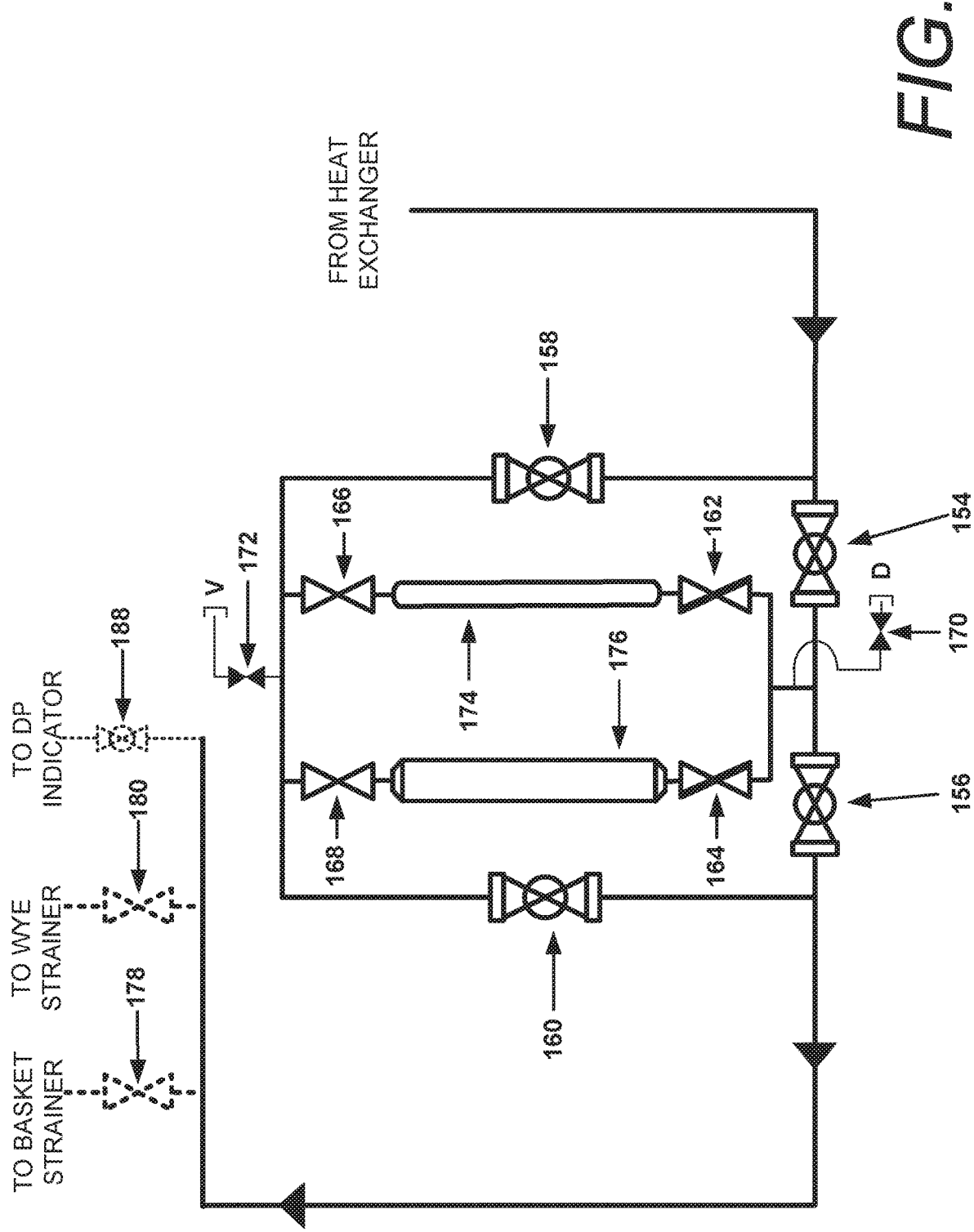
FIG. 6 is a piping diagram of a vertical flow velocity demonstrator portion of the preferred embodiment shown in FIG. 1.

FIG. 6 shows the VFVD section 262 in more detail. Flow into this section comes from the heat exchanger as discussed in FIG. 5, and splits to travel alternatively through a VFVD inlet valve 154 and a VFVD up-flow valve 158. Here, the user can selectively change the flow or shut off flow to one or both directions of this path. The VFVD up-flow valve 158 links to a flow pathway vertically up and over a 2" vertical flow velocity demonstrator pipe 174 and a 4" vertical flow velocity demonstrator pipe 176. This flow then joins any flow coming vertically up through the two vertical flow velocity demonstrator pipes 174, 176 after passing through a 2" VFVD outlet valve 166 or a 4" VFVD outlet valve 168, respectively. Flow passing up and over the two vertical flow velocity demonstrator pipes and joining flow from those pipes then passes through a VFVD down-flow valve 160 before joining any bypass flow and carrying on.

Horizontal flow through the VFVD inlet valve 154 instead passes below the two vertical flow velocity demonstrator pipes 174, 176. Flow could go vertically upward past a VFVD drain valve 170 and split into the two vertical flow velocity demonstrator pipes 174, 176 after passing through a 2" VFVD inlet valve 162 or 4" VFVD inlet valve 164, respectively. A VFVD vent valve 172 exists on the top of this section for venting purposes. Flow could alternatively bypass the two vertical flow velocity demonstrator pipes and instead pass through a VFVD outlet valve bypass 156 before carrying on.

Flow out of the VFVD section 262 can split between three paths, including flow to a basket strainer passing through a basket strainer inlet isolation valve 178, to a wye strainer passing through a wye strainer inlet isolation valve 180, or to a delta pressure (DP) indicator by passing through a strainer section delta pressure indicator inlet isolation valve 188. These three paths are all part of the filter section 260.

Figure 7:
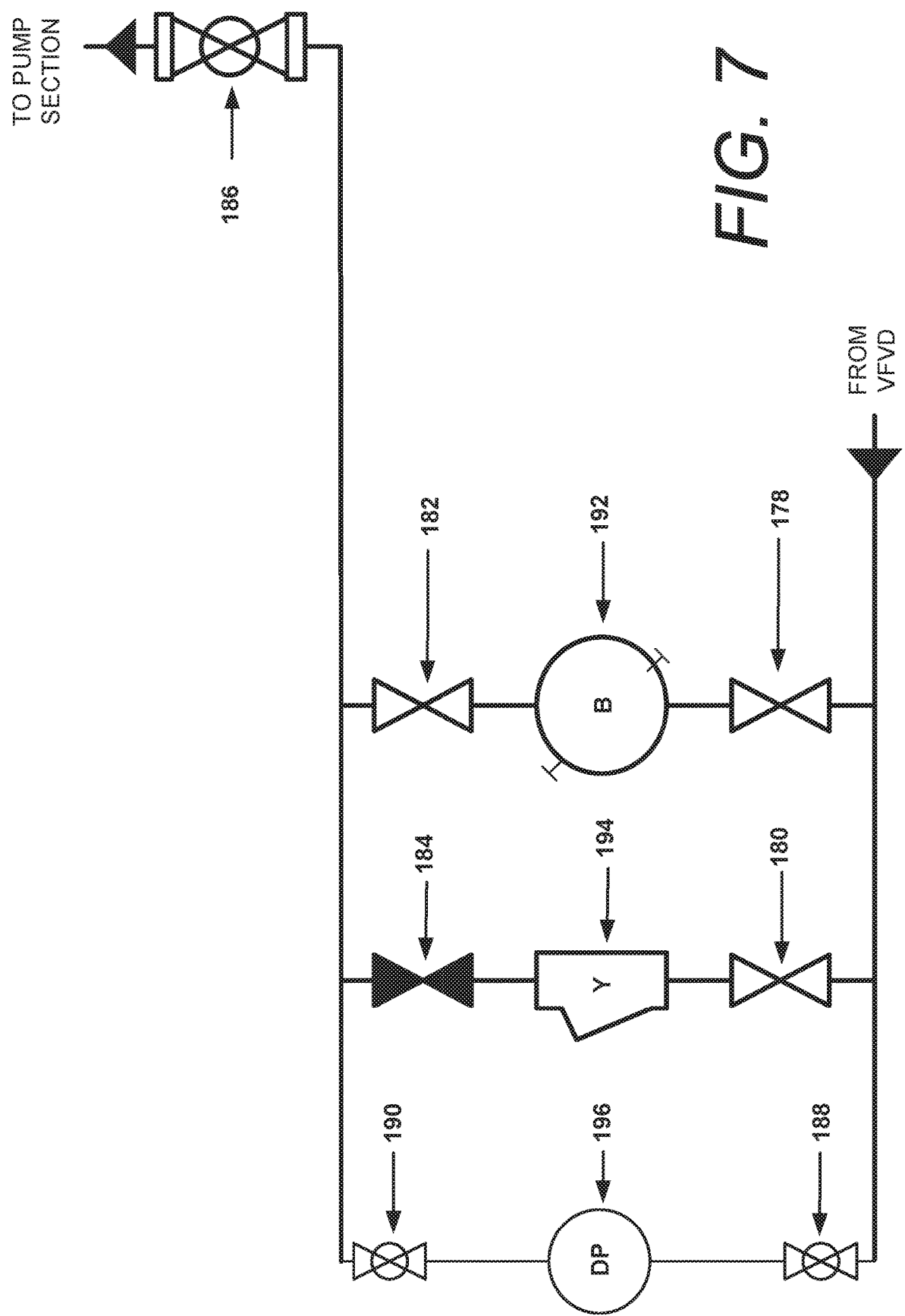
FIG. 7 is a piping diagram of a filter/strainer portion of the preferred embodiment shown in FIG. 1.

FIG. 7 shows the Filter Section 260 in more detail. Flow into the filter section comes out of the VFVD and flows through three potential paths. The first path flows through a basket strainer inlet isolation valve 178, a strainer section basket strainer 192, and finally out through a basket strainer outlet isolation valve 182. The second path flows through a wye strainer inlet isolation valve 180, through a strainer section wye strainer 194, and finally out through a wye strainer outlet isolation valve 184. The third path in this section flows into the strainer section delta pressure indicator hi side inlet isolation valve 188, into the strainer section differential pressure cell 196. Backpressure for the differential pressure cell is provided through a delta pressure indicator lo side outlet isolation valve 190. Finally, flow exits the filter section through a strainer section to pump section return isolation valve 186 and returns to the pump section 258.

Figure 8:
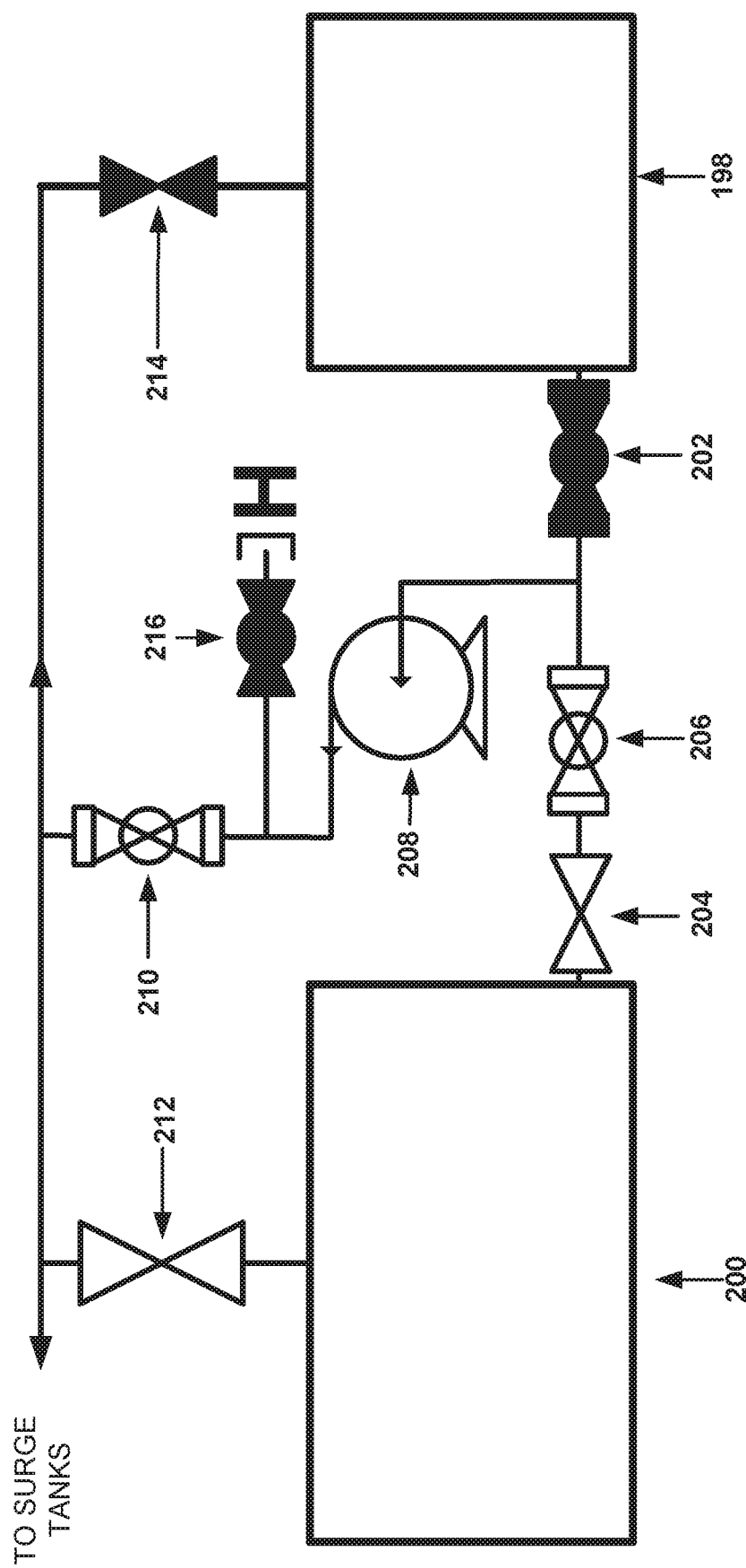
FIG. 8 is a piping diagram of a makeup/drain portion of the preferred embodiment shown in FIG. 1.

FIG. 8 shows the Makeup/Drain Tank Section 264 in more detail. This section contains makeup fluid for the system and a location for drained fluid from other sections to return to. This section includes a 100 gallon makeup/drain tank 198 and a 200 gallon makeup/drain tank 200. Flow out of the 100 gallon tank 198 flows through a 100 gallon tank outlet isolation valve 202, whereas flow out of the 200 gallon tank 200 flows through a 200 gallon tank outlet isolation valve 204 and a tank section cross connect valve 206 where the flow from the two tanks joins. A makeup pump 208 draws the flow from the tanks and sends it into the system. The flow passes a makeup pump pumpdown connection valve 216 before flowing through a makeup pump discharge isolation valve 210 and out to the surge tank section 256. Also as shown, flow out from the drain tanks can alternatively pass through a 200 gallon drain tank minimum flow recirculation throttle valve 212 from the 200 gallon tank 200 or through a 100 gallon drain tank minimum flow recirculation throttle valve 214 from the 100 gallon tank 198 and out to the surge tanks.

Figure 9:
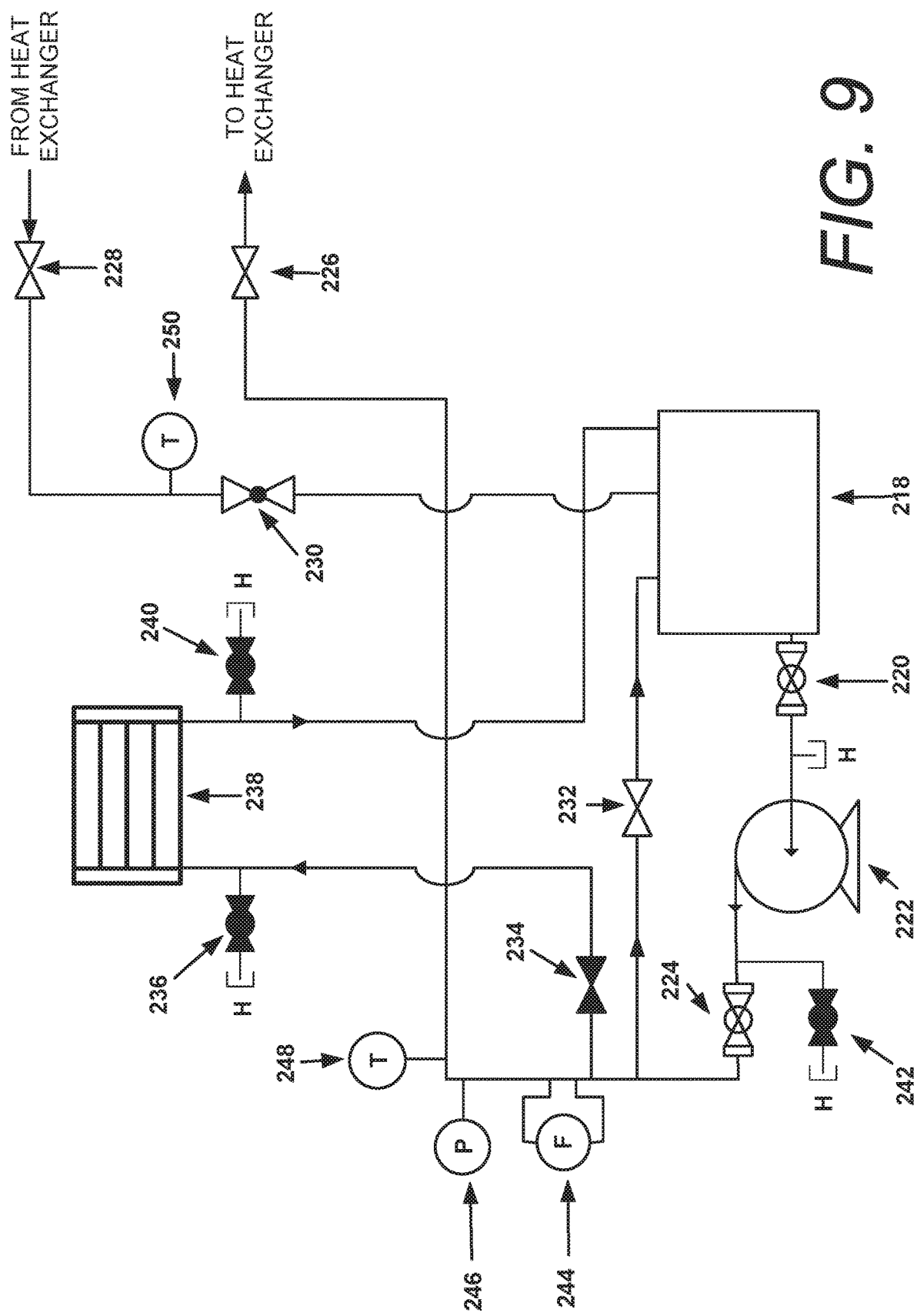
FIG. 9 is a piping diagram of a secondary loop portion of the preferred embodiment shown in FIG. 1.

FIG. 9 shows a secondary loop section 270 which provides a secondary loop from the heat exchanger section 268 and back to that section. Flow enters the secondary loop section 270 from the heat exchanger section 268 through a HXR secondary loop outlet isolation valve 228 and passes a temperature indicator 250 and throttle valve 230 on its way into a 100 gallon secondary loop tank 218. From the tank, flow follows one of two paths, the first being through a tank outlet isolation valve 220 into a secondary loop pump 222. The pump pumps the flow out through a secondary loop pump down valve 242 and through a secondary loop pump discharge isolation valve 224. Alternative minimum flow can be diverted to the 100 gallon secondary loop tank 218 through 232.

Flow then travels and splits again, one path traveling through a secondary loop heater inlet isolation valve 234 and into a secondary loop heater 238, after passing secondary loop heater inlet drain valve 236. Flow exits the heater 238 and passes a secondary loop heater outlet drain valve 240 and travels back to the 100 gallon secondary loop tank 218. A second path passes a secondary loop flow indicator 244, a secondary loop pressure indicator 246, and a secondary loop to HXR temperature indicator 248 before traveling back to the HXR section 268 through a HXR secondary loop inlet isolation valve 226.

Figure 10:
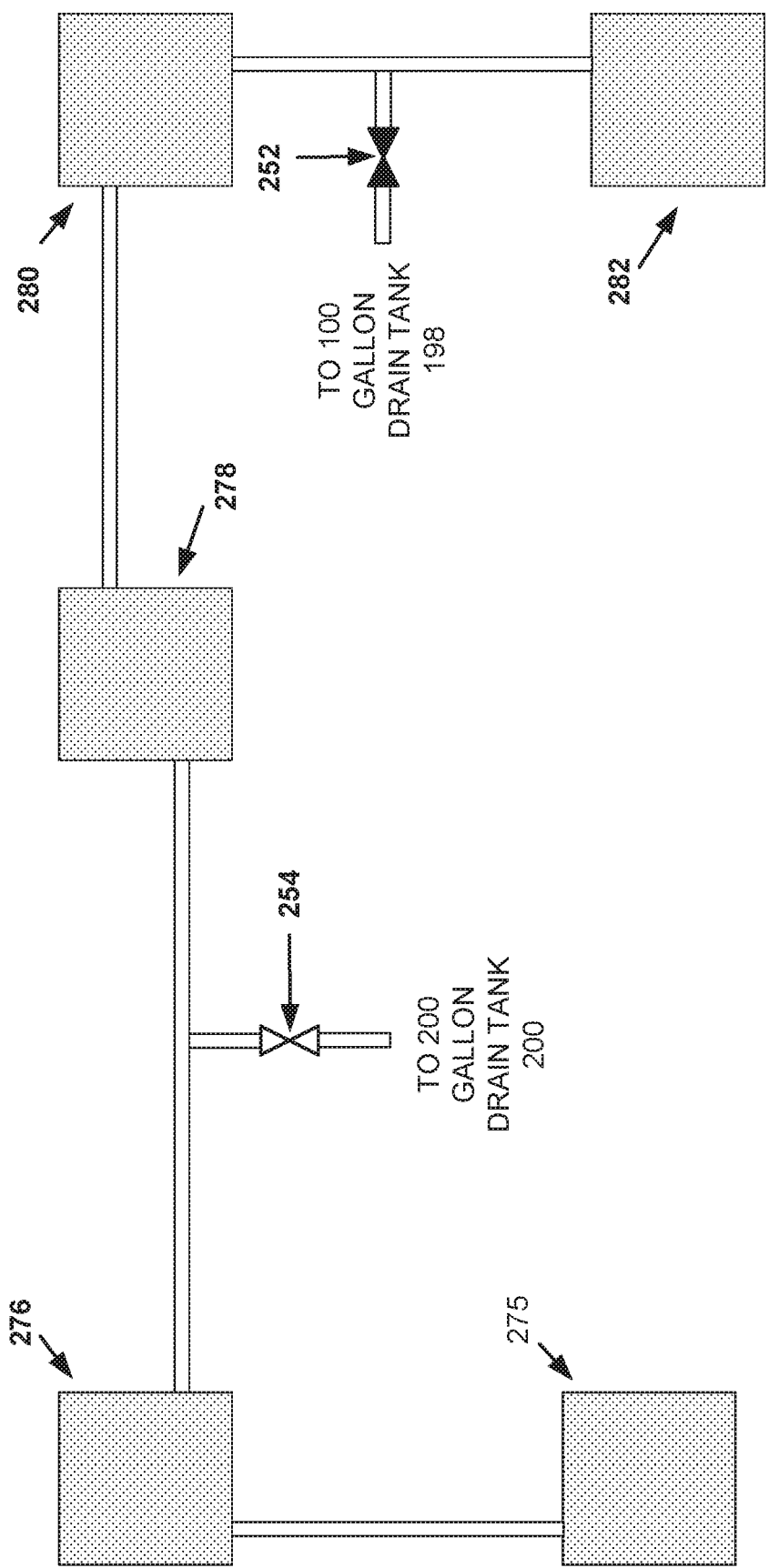
FIG. 10 is a piping diagram of a drain portion of the preferred embodiment shown in FIG. 1.

FIG. 10 shows the drain section 272 of the system 1, which connects all the drain boxes together. The 200 gallon drain tank 200 is fed through a 200 gallon drain tank inlet valve 254, whereas the 100 gallon drain tank 198 is fed through a 100 gallon drain tank inlet valve 252. FIG. 10 also shows the various drain boxes 275, 276, 278, 280 282 where the makeup/drain flow returns from the various sections of the system.

The system includes a "primary loop." The system is designed to move fluid through the primary loop. The clear primary loop pump(s) connect to system components via clear piping, with clear check valves, and Isolation valves. The primary loop pump(s) incorporate a clear suction line that incorporate surge tank(s). The primary loop pump(s) incorporate a discharge minimum flow system designed to prevent pump damage due to low flow overheating. The primary loop pump(s) discharge to horizontal piping designated as the horizontal flow velocity demonstrator(s). The horizontal flow velocity demonstrator is connected to the clear shell and tube heat exchanger via clear piping. The clear shell and tube heat exchanger is comprised of a clear shell designated as primary side, and a clear tube bundle designated as secondary side. The heat exchanger discharges to either a clear strainer or filter via clear piping. The strainer loop discharges via clear piping to the vertical flow velocity demonstrator comprised of clear valves and piping. The vertical flow velocity demonstrator discharges via clear piping to the pump(s) suctions via the suction return line(s).

The pump(s) are fed through the suction lines that are attached to surge tanks to ensure sufficient Net Positive Suction Head to prevent cavitation. The suction line(s) have a compound pressure gauge to indicate suction line pressure and a petcock to introduce air in the line(s) for demonstration purposes. Each pump has suction and discharge isolation(s), vent and drain capabilities; this allows removing a pump or pumps from the system for online or standby maintenance. Each pump has a minimum flow line that ensures sufficient flow to prevent the pump from overheating thus causing damage. Each pump discharges to a check valve to prevent reverse flow. The pump(s) have various impellers to show different flow design characteristics. The pump(s) tie together into a common discharge header that flows through the discharge check valve.

From the discharge check valve the flow path continues to the Horizontal Flow Velocity Demonstrator(s). Each Flow Velocity Demonstrator has inlet and outlet isolation valves to allow single line demonstration, and removal for maintenance while the system is in operation or standby.

From the Horizontal Flow Velocity Demonstrator(s) there are two possible flow paths; the Primary to Secondary Heat Exchanger(s) or the Heat Exchanger Bypass line. There is temperature and flow monitoring equipment before the divergence. The two flow paths converge downstream of the Primary Heat Exchanger(s). There is temperature and flow monitoring equipment after the Heat Exchanger(s), before the convergence.

From the heat exchanger(s) convergence, the flow path continues to the Vertical Flow Velocity Demonstrator(s). Each Flow Velocity Demonstrator has respective inlet and outlet isolation valves to allow single line demonstration, and removal for maintenance while the system is in operation or standby. The flow path through the Vertical Flow Velocity Demonstrators can be varied from up or down flow depending on the necessary parameters.

From the Vertical Flow Velocity Demonstrator section, the flow path proceeds to the strainer and filter section. There are various types of strainers and filters available. Each strainer or filter has inlet and outlet isolation valve to allow maintenance while the system is in operation or standby.

From the strainer and filter section, the flow path returns to the suctions of the primary pumps. There are High Point Vents throughout the system to promote air removal when the system needs to be water solid. There are Low Point Drains throughout the system to allow water to be removed as required.

It should be noted that the heat exchanger could include colored fluid flowing through the transparent piping, such as red indicating hot fluid flow and blue indicating cool fluid flow. This coloring element would provide a visual indicator to trainees of what is occurring within a heat exchanger. Plastic or PVC material used for the clear piping does not make a good heat conductor; however, the entire tube assembly could be quickly and easily substituted out for a copper tubing system which actually transfers heat, monitored by external devices such as temperature gauges.

The system further includes a "secondary loop." The secondary loop pump(s) takes suction from the secondary loop tank via isolation valves and clear piping. The secondary loop pump(s) discharge to the inlet (tube) side of the primary loop heat exchanger via clear piping, isolation and throttle valves. The secondary loop pump(s) incorporate a discharge minimum flow system designed to prevent pump damage due to low flow overheating. The fluid is routed through the heat exchanger via clear piping (tubes). The outlet of the heat exchanger is routed back to the secondary loop tank via clear piping, isolation and throttle valves. The secondary loop tank contains a fluid heating unit.

The pump is fed through the clear suction line attached to Secondary Loop Tank to ensure sufficient net positive suction head to prevent cavitation. Each pump has suction and discharge isolation(s), vent and drain capabilities; this allows removing pump from the system for online or standby maintenance. Each pump has a minimum flow line that ensures sufficient flow to prevent the pump from overheating thus causing damage.

From the discharge of the pump, flow passes into the heat exchanger through valves used to regulate flow. From the outlet of the heat exchanger, flow is returned to the Secondary Loop Tank through clear piping.

The system further includes a makeup loop designed to move fluid through the makeup loop for maintaining system fluid inventory. The makeup loop pump(s) takes suction from the makeup loop tank/drain tank via isolation valves and clear piping. The makeup loop pump(s) discharge to the makeup throttle valve via clear piping, isolation and throttle valves. The makeup loop pump(s) incorporate a discharge minimum flow system designed to prevent pump damage due to low flow overheating. The makeup loop discharges to the surge tank via clear piping. The makeup loop can be discharged to the primary loop for fill and vent activities.

The pump is fed through the clear suction line attached to Makeup/Drain Tank to ensure sufficient net positive suction head to prevent cavitation. Each pump has suction and discharge isolation(s), vent and drain capabilities; this allows removing pump from the system for online or standby maintenance. Each pump has a minimum flow line that ensures sufficient flow to prevent the pump from overheating thus causing damage.

From the discharge of the pump, there are two possible flow paths: (1) The surge tank(s); and (2) directly to the system for fill and vent operations.

The system further includes a drain loop designed to direct fluid from the system into makeup tanks or drain tanks as described briefly above.

A scenario for placing the "C" primary loop pump in series operation is outlined below in a series of steps. These steps can be used for training students or other personnel in proper use of the system, and the clear components and pipe sections allow the trainees to see what is actually occurring within the system internally. This scenario is designed to show the difference between parallel and series pump operations, which can be difficult to conceptually understand without being able to visualize it, which the visual training flow system 1 does.

Step one: Ensure the "A" primary loop pump 18 or "B" primary loop pump 50 is running and flow is balanced. Step two: ensure the "C" primary loop pump 72 is running and flow is balanced. Step three: record the "C" primary loop pump suction pressure indicator 78 pressure. Step four: record the primary loop pump discharge pressure indicator 48 pressure. Step five: open the "C" primary loop pump series inlet valve 40. Step six: close the "C" primary loop pump suction isolation valve 74. Step seven: close the "C" primary loop pump series isolation valve 42. Step eight: record the "C" primary loop pump suction pressure indictor 78 pressure again. Step nine: record the primary loop pump discharge pressure indicator 48 pressure again. And step ten: observe the differences between the two alignments in pressure readings.

III. Alternative Embodiment Portable Dynamic Fluid Flow Training System 300

The above outlined embodiment is a permanent fixture for training within a facility. However, often a system of this scale is not needed, or there may be a desire to deliver the features of the present invention to multiple facilities. A portable solution allows for the entire functionality of the dynamic fluid flow training system to be moved from site to site for training purposes.

Figure 11:
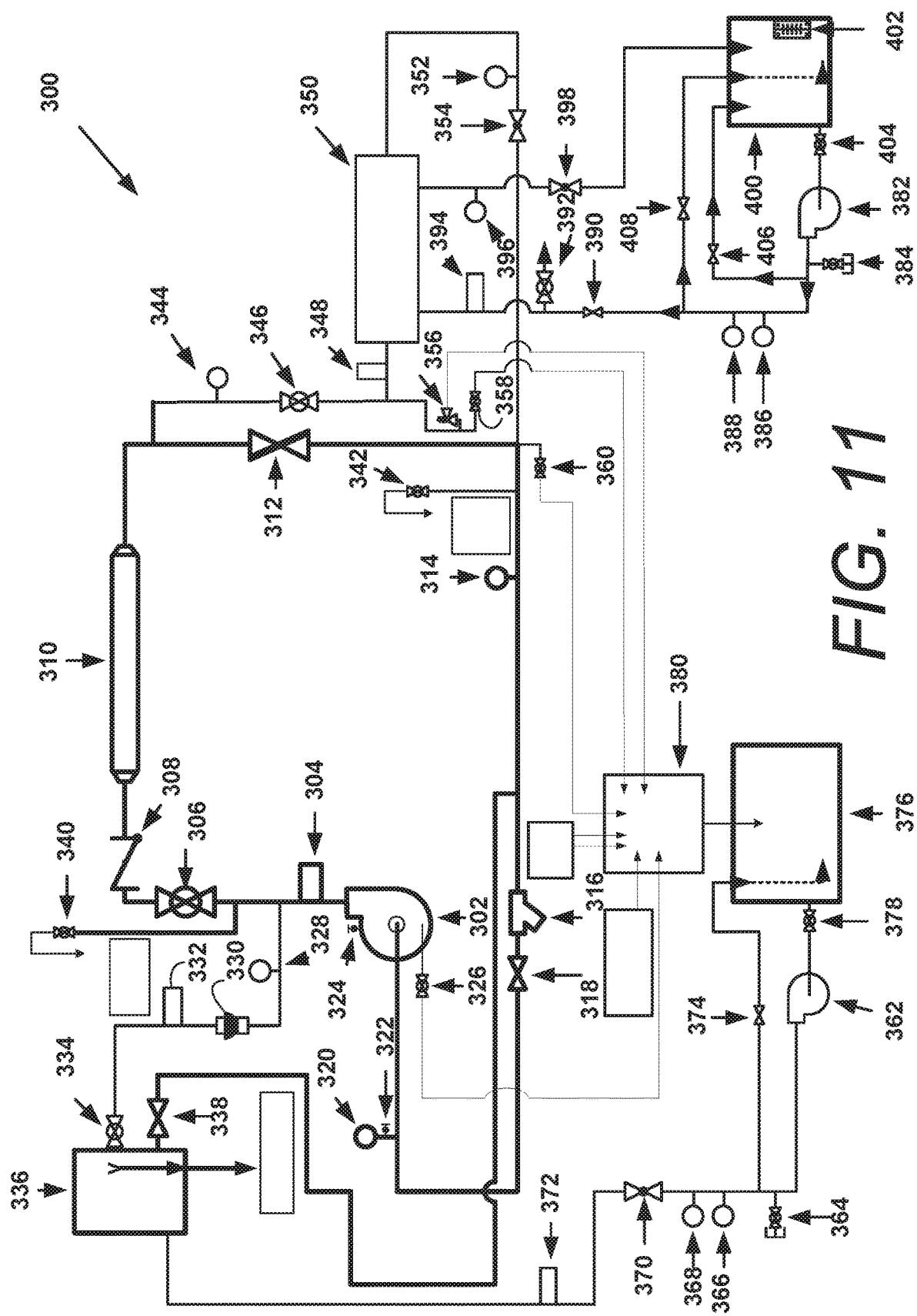
FIG. 11 is a piping diagram of a mobile/portable fluid flow trainer.

Referring to FIG. 11, there is a primary loop pump 302 which initiates the pumping of fluid through the primary loop of the mobile fluid flow trainer system 300. Flow passes from the pump past a primary loop pump discharge flow indicator 304, where it then can diverge amongst a few paths. The first path takes flow through a primary loop pump discharge isolation valve 306 and a primary loop pump discharge check valve 308 into a primary loop flow velocity demonstrator 310, similar to the velocity demonstrators of the previous embodiment. This large, transparent section allows for viewing of flow velocity during experiments and training using the system. It should be noted that flow from the primary loop pump 302 to the velocity demonstrator 310 also passes an optional primary loop discharge high point vent valve 340 which vents to the drain box 380.

From the velocity demonstrator 310, flow passes on to either a heat exchanger 350 or a bypass valve 312. Flow to the heat exchanger 350 first passes a heat exchanger (HXR) primary loop inlet temperature indicator 344, then through a HXR primary loop inlet isolation valve 346, past a primary loop to HXR flow indicator 348 into the heat exchanger 350 itself. Flow out of the heat exchanger 350 then goes back to the primary loop past an HXR outlet temperature indicator 352 passing through an outlet isolation valve 354.

Flow from the velocity demonstrator 310, flow passes through a primary loop HXR bypass valve 312 and by primary loop suction side low point drain valve 360.

The secondary loop primarily includes flow from the heat exchanger 350 to a secondary loop tank 400 having a secondary loop tank heater 402 within it. Flow out of the heat exchanger to the secondary loop tank flows past a HXR secondary loop outlet temperature indicator 396 and through a HXR secondary loop outlet throttle valve 398. Flow out from the secondary loop tank 400 is drawn out through a secondary loop pump suction isolation valve 404 by a secondary loop pump 382. Flow passes a secondary loop pump-out valve 384 and either returns to the secondary loop tank 400 directly through a secondary loop pump to secondary loop tank upper recirculation valve 406, or flow passes a secondary loop temperature indicator 386 and secondary loop pressure indicator 388, through a secondary loop pump to secondary loop tank lower recirculation valve 408 and back to the secondary tank 400. Otherwise flow returns past the secondary loop temperature 386 and pressure 388 indicators, through a HXR secondary loop inlet isolation valve 390, past a secondary loop high point vent valve 392 and a HXR secondary loop inlet flow indicator 394 and back into the heat exchanger 350.

Flow from the heat exchanger 350 back towards the primary loop passes a HXR primary loop outlet temperature indicator 352 and through a HXR primary loop outlet throttle valve 354, where it then returns to the primary loop pump 302.

Flow back to the primary loop pump 302 passes a primary loop suction high point vent valve 342 which drains to the drain box, and a primary loop combined outlet temperature indicator 314, and then through a primary loop Y-strainer 316 and primary loop pump suction isolation valve 318, past a primary loop pump suction pressure indicator 320 having an associated vent valve 322, and back into the pump 302 which has its own pump casing vent valve 324 and casing drain valve 326.

Flow from the primary loop pump 302 also travels to the surge tank 336 past a primary loop pump discharge pressure indicator 328, primary loop recirculation flow check valve 330, and past a primary loop recirculation flow indicator 332, through a primary loop recirculation flow to surge tank isolation valve 334 to the surge tank 336.

The drain box 380 drains to a makeup/drain tank 376 which can then be pumped back into the surge tank 336 using a makeup loop pump 362 which draws flow from the makeup/drain tank 376 through a makeup loop pump suction isolation valve 378. Recirculation to the makeup/drain tank 376 passes a makeup loop to makeup tank recirculation valve 374. Additional flow passes a makeup loop pump-out valve 364 and travels past a makeup loop temperature indicator 366 and makeup loop pressure indicator 368, through a makeup loop to surge tank supply throttle valve 370, and back into the surge tank 336.

Figure 12:
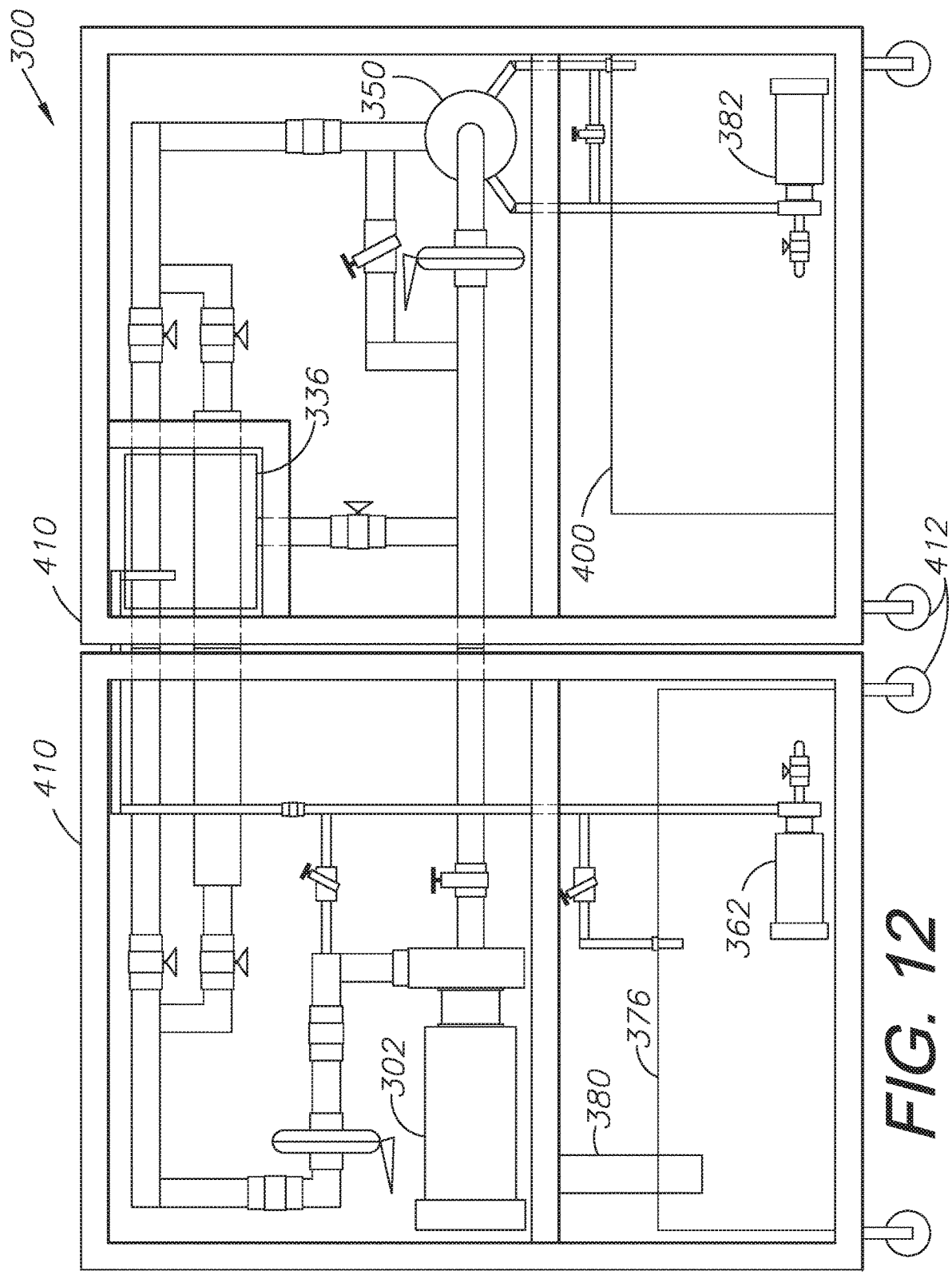
FIG. 12 is an illustrated diagram of a mobile/portable fluid flow trainer.

FIG. 12 shows a picture diagram of a CCFF Portable Fluid Flow Trainer that is moveable, including a multi-level platform consisting of multiple separate units that consist of a framework made of strut channel design materials. All equipment is strategically placed on decking trays that are designed to contain and divert any fluids to drains due to unforeseen leakage, draining and maintenance activities. The placement of the equipment facilitates the demonstration and instruction methods referred to in the previous statement(s).

As shown in FIG. 12, this mobile fluid training system 300 fits onto a pair of mobile shelves 410 including casters 412 for easy movement. The drain tank 376, secondary loop tank 400, surge tank 336, all various piping pieces and connections (e.g. elbows, T-sections, and joining pieces), are made from translucent material to allow the users to see the fluid flow within the pipes. The pumps 302, 362, 382 similarly are made from translucent material where available, such that the action of the pumps on the fluid is clearly visible to the users. Fluids in the primary and secondary loops may be alternately colored to show differences in the system flow paths.

Such a system could fit into the back of a standard transport trailer or even a smaller vehicle such as a transport truck. Such a system could even be built into a truck, trailer, bus, or RV for deployment on site. In such as system, the walls of the vehicle may deploy, thereby allowing users immediate access to the system without taking it off of the truck or out of the trailer for temporary setup on site.

In practice, the portable dynamic fluid flow training system 300 can be used to perform various tests and demonstrations for training individuals in the functions of a typical flow system. The clear piping, pumps, valves, and other components provide the trainees an unobstructed view of what is actually occurring within the system when certain errors are introduced.

One training scenario includes the filling and venting of the primary loop of the portable dynamic fluid flow training system 300. This scenario is designed to teach a trainee or student the proper way to fill and vent a system and the effects of improperly performing the evolution.

Step one to this process requires the trainee to ensure the makeup/drain tank 376 is filled to 85%. Next, the trainee ensures the makeup loop to surge tank supply throttle valve 370 is closed. Step three is to ensure the makeup tank recirculation valve 374 is throttled open four turns.

Once these checks are made, the user starts the makeup loop pump 362 at step 4. The user throttles the makeup loop to makeup tank recirculation valve 374 to obtain a 7.5 PSIG on the makeup loop pressure indicator 368 at step five. At step six, while simultaneously throttling open the makeup loop to surge tank supply throttle valve 370 and closing the makeup loop to makeup tank recirculation valve 374, the user must ensure to maintain pressure on the makeup loop pressure indicator 368 at 7.5 PSIG and the flow through the makeup loop to surge tank flow indicator 372 at less than five gallons per minute (GPM).

At step seven, the entire system 300 should be at full vent in the following three areas: the primary loop pump casing vent valve 324, the primary loop suction high point vent valve 340, and the primary loop suction high point vent valve 342. If desired, at step eight, while throttling open the makeup loop to makeup tank recirculation valve 374, and closed on makeup loop to makeup tank recirculation valve, the user should ensure that pressure is maintained on the makeup loop to makeup tank recirculation valve 374 at 7.5 PSIG. To end the process, the user stops the makeup loop pump 362 to reset the system.

Another scenario which can be performed using the portable dynamic fluid flow training system 300 (though the same procedure can be accomplished on the larger room-sized fluid flow training system 1 using similar steps) results in cavitation and voiding of the primary loop. This scenario is designed to teach the student the effects of improper net positive suction head (NPSH) within the system.

Step one: fill and vent the system using the first scenario above. Step two: start the primary loop pump 302. Step three: while monitoring pressure on the primary loop pump discharge pressure indicator 328, slowly close the primary loop surge tank outlet isolation valve 338. At this stage, it is easy to observe gasses being formed within the fluid as it flows through the system due to loss of NPSH. The gasses form bubbles clearly visible in the liquid through the clear pipes, valves, and other components.

Step four: check the primary loop pump 302 for the accumulation of gasses at the suction eye of the pump. They should be visible. Step five: while monitoring the pressure on the primary loop recirculation flow indicator 332, slowly throttle closed the primary loop pump suction isolation valve 318. Note that the primary loop pump suction isolation valve 318 has to be throttled more than ⅔ of the way closed before the effects will be visible in the flow.

Step six: observe that there is cavitation beginning to form directly downstream of the primary loop pump suction isolation valve 318. Cavitation can be confirmed both visually and audibly within the system. Step seven: continue to slowly throttle closed the primary loop pump suction isolation valve 318. At approximately 90% closure of that valve, a cavitation eye will form at the suction eye of the pump 302.

Step eight: the cavitation eye, if allowed to continue along the course set by steps one through seven, will cause degradation of the pump 302 impeller and lowering of the pumps flow characteristics. Step nine: observe that no outside air is being introduced into the system but, as gasses come out of the liquid solution due to the lowering of system pressure to below the saturation point, enough fluid is displace in the system to begin to form voids throughout the system, such as in the flow velocity demonstrator(s), heat exchanger, surge tank outlet line vertical section If this condition continues, the system will eventually suffer surge flow oscillations. Step 11: secure the primary loop pump 302 and observe where the void areas within the piping gather. Step 12: perform the appropriate fill and vent procedures, resetting the fluid within the system, prior to restarting the primary loop pump 302. This will ensure the pump doesn't suffer additional permanent damage.

A third scenario places the heat exchanger primary and secondary loops into service. This scenario is designed to show the flow characteristics of different valves as they are throttled, as well as to show heat transfer from higher to lower temperatures.

Step one: pre-heat the secondary side to 110° F. Step two: fill and vent the system 300 per the first scenario above. Step three: ensure the heat exchanger primary loop outlet throttle valve 354 is open. Step four: start the primary loop pump 302. Step five: throttle closed the primary loop heat exchanger bypass valve 312. Step six: throttle the heat exchanger primary loop outlet throttle valve 354 to establish primary side flow to six GPM.

At step seven, you should record the makeup loop temperature indicator 366 and makeup loop pressure indicator 368 values. Step eight: ensure the heat exchanger secondary loop outlet throttle valve 398 is open. Step nine: start the secondary loop pump 382. Step ten: close the secondary loop pump to secondary loop tank lower recirculation valve 408. Step eleven: simultaneously throttle the heat exchanger secondary loop outlet throttle valve 398 closed while throttling the secondary loop pump to secondary loop tank lower recirculation valve 408 open to establish secondary flow into the heat exchanger secondary loop inlet flow indicator 394 at two GPM.

Finally, step twelve: record the secondary loop temperature indicator 386 and secondary loop pressure indicator 388 values; and step 13: start a stopwatch and record the time it takes for the primary and secondary loops to reach equilibrium in temperature and pressure.

A fourth scenario drains the primary loop. This scenario is designed to develop the proper techniques for draining a system without overflowing the drain system portion.

Step one: ensure the primary loop pump 302 is not running. Step two: slowly throttle open the primary loop discharge side low point drain valve 358. Step three: slowly throttle open the primary loop suction side low point drain valve 360. Step four: slowly open the primary loop pump casing drain valve 326. Step five: slowly open the primary loop discharge high point vent valve 340. And finally, step six: slowly open the primary loop suction high point vent valve 342. This will drain the primary loop.

These four scenarios could also be run using the room-sized flow trainer system 1.

It is to be understood that while certain embodiments and/or aspects of the invention have been shown and described, the invention is not limited thereto and encompasses various other embodiments and aspects.

Having thus described the invention, what is claimed as new and desired to be secured by Letters Patent is:

1. A training system comprising:
a fluid flow system comprising a plurality of pipe segments joined together by a plurality of valves;
said plurality of pipe segments and plurality of valves configured to form a primary pump section, a filter section, a vertical flow velocity demonstrator (VFVD) section, a makeup/drain tank section, a horizontal flow velocity demonstrator (HFVD) section, a heat exchanger (HXR) section, a secondary pump section, a drain section, and a HXR bypass section;
at least one secondary loop pump connected to said secondary pump section;
a pair of surge tanks comprised of semi-transparent material;
said primary pump section comprising a first primary pump, a second primary pump, and a third primary pump;
said first primary pump configured to pump fluid through said fluid flow system along a first flow loop;
said second primary pump configured to pump fluid through said fluid flow system along a second flow loop;
said third primary pump configured to pump fluid through said fluid flow system along a third flow loop;
wherein each of said first, second, and third primary pumps comprises a respective first, second, and third casing drain valve and first, second, and third casing vent valve;
wherein each of said plurality of pipe segments are all comprised of semi-transparent material;
wherein each of said plurality of valves are at least partially comprised of semi-transparent material;
wherein said first, second and third primary pumps each comprise a housing comprised of semi-transparent material;
wherein said at least one secondary loop pump comprises a housing comprised of semi-transparent material; and
said fluid flow system configured to provide visual confirmation of fluid flowing through said plurality of pipe segments and said plurality of valves.

2. The system of claim 1, further comprising:
said first flow loop comprising a first minimum flow valve configured for providing a minimum flow through said first flow loop, and first flow loop being connected to a first surge tank of said pair of surge tanks; and
said second flow loop comprising a second minimum flow valve configured for providing a minimum flow through said second flow loop, and second flow loop being connected to a second surge tank of said pair of surge tanks.

3. The system of claim 1, further comprising:
said HXR section comprising a heat exchanger, and a heat exchanger bypass inlet isolation valve configured for flow to bypass said heat exchanger to said HXR bypass section; and
wherein said HXR section is directly connected to said secondary pump section.

4. The system of claim 3, further comprising:
said secondary pump section comprising the at least one secondary loop pump, a secondary loop tank, and a heater;
flow entering said secondary pump section from said HXR section configured for at least temporary storage within said secondary loop tank;
flow from said heater configured to be drawn from said secondary loop tank by said secondary loop pump, heated by said heater, and recirculated into said secondary loop tank; and
flow from said secondary loop tank alternatively configured to be returned to said HXR section.

5. The system of claim 1, further comprising:
a pair of shelving units, each configured to contain portions of said fluid flow system;
connectors connecting a first of said pair of shelving units to a second of said pair of shelving units such that said fluid flow system is entirely mounted within said pair of shelving units; and
each of said pair of shelving units mounted on top of casters which allow said shelving units to be rolled along a floor surface.

* * * * *